(12) United States Patent
Park et al.

(10) Patent No.: US 8,334,896 B2
(45) Date of Patent: Dec. 18, 2012

(54) STEREOSCOPIC IMAGE DISPLAY DEVICE AND METHOD OF DRIVING THE SAME

(75) Inventors: Juun Park, Paju-si (KR); Seungchul Lee, Paju-si (KR); Sungmin Jung, Incheon (KR)

(73) Assignee: LG Display Co., Ltd., Seoul (KR)

( * ) Notice: Subject to any disclaimer, the term of this patent is extended or adjusted under 35 U.S.C. 154(b) by 488 days.

(21) Appl. No.: 12/591,945

(22) Filed: Dec. 4, 2009

(65) Prior Publication Data

US 2010/0157032 A1    Jun. 24, 2010

(30) Foreign Application Priority Data

Dec. 19, 2008    (KR) .................. 10-2008-0130529

(51) Int. Cl.
*H04N 13/04*    (2006.01)

(52) U.S. Cl. ................ 348/51; 348/55; 348/57
(58) Field of Classification Search .............. None
See application file for complete search history.

(56) References Cited

U.S. PATENT DOCUMENTS

| 6,975,345 B1* | 12/2005 | Lipton et al. | 348/57 |
| 8,217,996 B2* | 7/2012 | Kane et al. | 348/55 |
| 2002/0080496 A1* | 6/2002 | Kaschke et al. | 359/630 |
| 2005/0151152 A1* | 7/2005 | Miller et al. | 257/103 |
| 2007/0008314 A1* | 1/2007 | Song et al. | 345/419 |
| 2007/0165304 A1* | 7/2007 | Tomita | 359/464 |

* cited by examiner

*Primary Examiner* — Mohamed Ibrahim
(74) *Attorney, Agent, or Firm* — McKenna Long & Aldridge LLP (57) ABSTRACT

A stereoscopic image display device and a method of driving the same are disclosed. The stereoscopic image display device includes a display device, polarization glasses, a polarization switching element that includes a plurality of scan electrode lines and switches a polarization characteristic of light travelling to the polarization glasses according to a voltage supplied to the scan electrode lines, a driver supplying a first voltage synchronized with a right eye image displayed on the display device and a second voltage synchronized with a left eye image displayed on the display device to the scan electrode lines, and a controller controlling the driver so that a voltage of the scan electrode lines varies from the first voltage to the second voltage along a line of the display device in which the right eye image and the left eye image change.

13 Claims, 8 Drawing Sheets

| t=0 | t1 | t2 | | | tN-1 | 1Tf | | | | | | 2Tf | | | |
|---|---|---|---|---|---|---|---|---|---|---|---|---|---|---|---|
| 0 | 1 | 1 | ... | 1 | 1 | 1 | 0 | 0 | ... | 0 | 0 | 0 | 1 | 1 | ... |
| 0 | 0 | 1 | ... | 1 | 1 | 1 | 1 | 0 | ... | 0 | 0 | 0 | 0 | 1 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 0 | 1 | 1 | 1 | 1 | ... | 1 | 0 | 0 | 0 | 0 | ... |
| 0 | 0 | 0 | ... | 0 | 0 | 1 | 1 | 1 | ... | 1 | 1 | 0 | 0 | 0 | ... |

STEREOSCOPIC IMAGE DISPLAY DEVICE AND METHOD OF DRIVING THE SAME

This application claims the benefit of Korean Patent Application No. 10-2008-0130529 filed on Dec. 19, 2008, the entire contents of which is incorporated herein by reference for all purposes as if fully set forth herein.

BACKGROUND OF THE INVENTION

1. Field of the Invention

Embodiments of the invention relate to a stereoscopic image display device capable of synchronizing left and right eye images displayed on a display device with an operation of a polarization switching element and a method of driving the stereoscopic image display.

2. Discussion of the Related Art

A stereoscopic image display device is mainly classified into a stereoscopic technique and an autostereoscopic technique.

In the stereoscopic technique providing a high stereoscopic effect through a difference between left and right eye images, there are a glasses type and a non-glasses type. Both the two types have been put to practical use. In the glasses type stereoscopic image display device, left and right eye images whose polarization directions change are displayed on a direct type display device or a projector or the left and right eye images are time-division displayed on the direct type display device or the projector. The glasses type stereoscopic image display device displays a stereoscopic image using polarization glasses or a liquid crystal shutter. In the non-glasses type stereoscopic image display device, an optical plate, such as a parallax barrier, for separating optical axes of left and right eye images from each other is positioned in the front or in the rear of a display screen.

The glasses type stereoscopic image display device may include a switching retarder for switching polarization characteristic of light incident on polarization glasses on a display device. In the glasses type stereoscopic image display device, the display device alternately displays the left and right eye images, and the switching retarder switches the polarization characteristic of light incident on the polarization glasses. Accordingly, the glasses type stereoscopic image display device can display a stereoscopic image without a reduction in resolution by time-division displaying the left and right eye images.

A liquid crystal display (LCD) may be used as the display device of the stereoscopic image display device. The liquid crystal display sequentially writes data from a first line to a last line of the display device to thereby display an image. When the liquid crystal display starts to be charged to the data, liquid crystal molecules of the liquid crystal display react and start to move. Because of such a delay of a response time, a display time of an entire image during 1 frame period ranges from a response end time point of liquid crystals after writing data to all of liquid crystal cells of the liquid crystal display to a time point immediately before writing data to a first line in a next frame period. When the liquid crystal display alternately displays the left and right eye images, the related art glasses type stereoscopic image display device may cause pseudo-stereoscopic vision in a boundary potion where the left eye image changes to the right eye image or in a boundary potion where the right eye image changes to the left eye image because the data writing of the liquid crystal display is not synchronized with an operation of the switching retarder.

Accordingly, in the glasses type stereoscopic image display device, the left and right eye images have to be alternately displayed on the display device, and the switching retarder has to be synchronized with the left and right eye images. However, the left and right eye images may be displayed on the display device in the unstable order or the order of the left and right eye images may change if an initial drive of the display device is unstable or driving circuits of the display device may be operated in erroneous operation. As a result, the left and right eye images displayed on the display device is not synchronized with the operation of the switching retarder because of the unstable order of the left and right eye images, and thus the pseudo-stereoscopic vision may be caused.

SUMMARY OF THE INVENTION

Embodiments of the invention provide a stereoscopic image display device capable of synchronizing left and right eye images displayed on a display device with an operation of a polarization switching element and a method of driving the stereoscopic image display.

In one aspect, there is a stereoscopic image display device comprising a display device that time-division displays a right eye image and a left eye image, polarization glasses in which a polarization characteristic of a right lens and a polarization characteristic of a left lens are different from each other, a polarization switching element between the display device and the polarization glasses, the polarization switching element including a plurality of scan electrode lines, the polarization switching element switching a polarization characteristic of light travelling to the polarization glasses according to a voltage supplied to the scan electrode lines, a driver that supplies a first voltage synchronized with the right eye image displayed on the display device to the scan electrode lines and supplies a second voltage synchronized with the left eye image displayed on the display device to the scan electrode lines, and a controller that supplies right eye video data of the right eye image and left eye video data of the left eye image to the display device and controls the driver so that a voltage of the scan electrode lines varies from the first voltage to the second voltage along a line of the display device in which the right eye image and the left eye image change.

The display device includes one of a liquid crystal display (LCD), a field emission display (FED), a plasma display panel (PDP), and an electroluminescence device (EL).

The stereoscopic image display device further comprises an image supply unit that inserts a first identification code into the right eye video data, inserts a second identification code into the left eye video data, and supplies the right eye video data and the left eye video data, into which the first and second identification codes are respectively inserted, to the controller.

The first identification code is inserted into pixel data, that will be supplied to a pixel positioned at a corner of the display device, among the right eye video data. The second identification code is inserted into pixel data, that will be supplied to a pixel positioned at a corner of the display device, among the left eye video data.

The image supply unit supplies video data of a 2-dimensional (2D) format to the controller in a 2D mode and supplies the right eye video data including the first identification code and the left eye video data including the second identification code to the controller in a 3-dimensional (3D) mode.

The image supply unit switches between the 2D mode and the 3D mode according to a user's selection input through a user interface.

The controller checks the first and second identification codes to allow the voltage of the scan electrode lines to switch between the first voltage and the second voltage.

In another aspect, there is a method of driving a stereoscopic image display device comprising time-division displaying a right eye image and a left eye image on a display device, switching a polarization characteristic of light travelling to polarization glasses according to a voltage supplied to a plurality of scan electrode lines formed in a polarization switching element between the display device and the polarization glasses, supplying a first voltage synchronized with the right eye image displayed on the display device to the scan electrode lines and supplying a second voltage synchronized with the left eye image displayed on the display device to the scan electrode lines, and supplying right eye video data of the right eye image and left eye video data of the left eye image to the display device and varying a voltage of the scan electrode lines from the first voltage to the second voltage along a line of the display device in which the right eye image and the left eye image change.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings.

Figure 1:
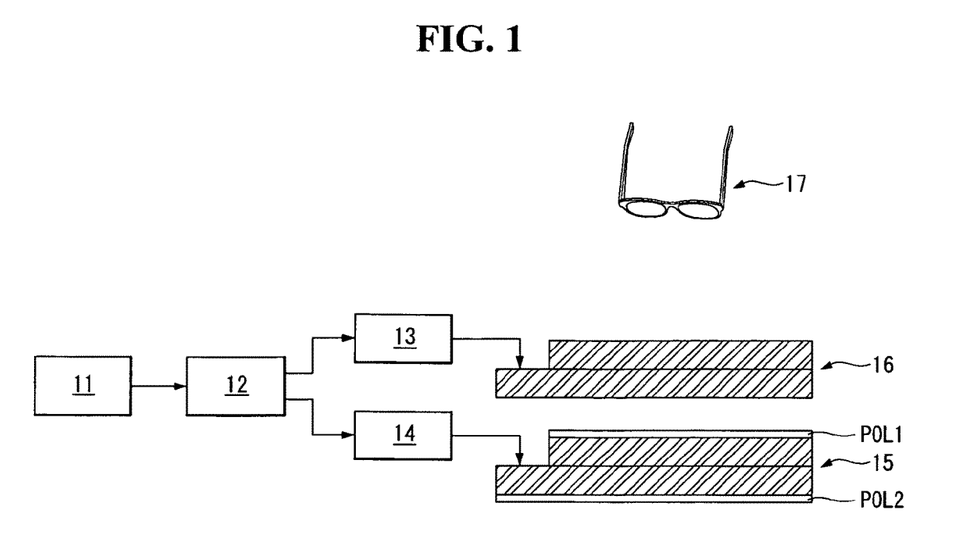
FIG. 1 is a block diagram of a stereoscopic image display device according to an embodiment of the invention.
Figure 2:
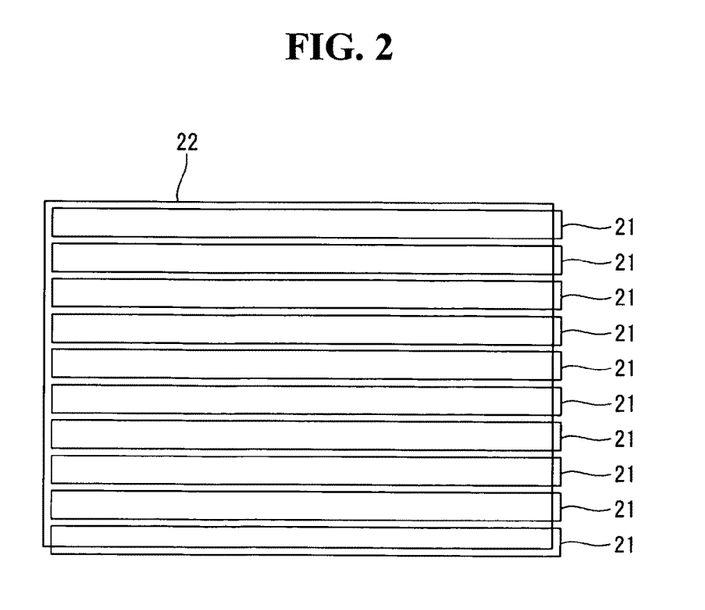
FIG. 2 illustrates electrode patterns of upper and lower plates of a polarization switching element.

As shown in FIGS. 1 and 2, a stereoscopic image display device according to an embodiment of the invention includes a display device 15, a polarization switching element 16, polarization glasses 17, an image supply unit 11, a controller 12, a first driver 13, and a second driver 14.

The display device 15 may be implemented as a flat panel display, such as a liquid crystal display (LCD), a field emission display (FED), a plasma display panel (PDP), and an electroluminescence device (EL) including an inorganic light emitting diode and an organic light emitting diode (OLED). In the following description, the liquid crystal display is illustrated as an example of the display device 15. However, other flat panel displays may be used.

The display device 15 includes a thin film transistor (TFT) substrate and a color filter substrate. A liquid crystal layer is formed between the TFT substrate and the color filter substrate. Data lines and gate lines are formed on the TFT substrate to cross each other, and a plurality of liquid crystal cells are respectively arranged in a plurality of cell regions defined by the data lines and the gate lines in a matrix format. A TFT is formed at each of crossings of the data lines and the gate lines. The TFTs transfer a data voltage supplied through the data lines to pixel electrodes of the liquid crystal cells in response to a scan pulse from the gate lines. For the above-described operation, in each of the TFTs, a gate electrode is connected to the gate line, a source electrode is connected to the data line, and a drain electrode is connected to the pixel electrode of the liquid crystal cell. A common voltage is supplied to a common electrode. The color filter substrate includes a black matrix and a color filter. The common electrode is formed on the color filter substrate in a vertical electric field driving manner, such as a twisted nematic (TN) mode and a vertical alignment (VA) mode. The common electrode and the pixel electrode are formed on the TFT substrate in a horizontal electric field driving manner, such as an in-plane switching (IPS) mode and a fringe field switching (FFS) mode. Polarizing plates POL1 and POL2 are respectively attached to the TFT substrate and the color filter substrate of the display device 15. Alignment layers for setting a pre-tilt angle of liquid crystals are respectively formed on the TFT substrate and the color filter substrate of the display device 15. The upper polarizing plate POL1 has a light absorption axis identical to a light absorption axis of a left eye polarization filter of the polarization glasses 17 and determines polarization characteristic of light incident on the polarization switching element 16 through the light absorption axis. The lower polarizing plate POL2 determines polarization characteristic of light incident on the display device 15. A spacer is formed between the TFT substrate and the color filter substrate of the display device 15 so as to provide a cell gap of the liquid crystal layer.

The display device 15 may be implemented in any liquid crystal mode as well as the TN, VA, IPS, and FFS modes. The display device 15 may be implemented in any type liquid crystal display including a backlit liquid crystal display, a transflective liquid crystal display, and a reflective liquid crystal display. Although it is not shown, a backlight unit is necessary in the backlit liquid crystal display and the transflective liquid crystal display.

The polarization switching element 16 comprises an upper glass substrate (or an upper transparent substrate) and a lower glass substrate (or a lower transparent substrate) that are faced to each other with a liquid crystal layer interposed therebetween. The liquid crystal layer may be comprised of liquid crystals of a TN mode having a retardation of 90°. As shown in FIG. 2, a common electrode 22 is formed on the upper glass substrate, and a plurality of scan electrode lines 21 each having a transversely straight pattern are formed on the lower glass substrate. A common voltage, that is an equipotential voltage of the common voltage supplied to the common electrode of the display device 15, is supplied to the common electrode 22. When a right eye image (or a left eye image) is displayed on lines of the display device 15 corresponding to the scan electrode lines 21, an equipotential voltage Voff of the common voltage is supplied to the scan electrode lines 21. Further, whenever the left eye image (or the right eye image) is displayed on lines of the display device 15 corresponding to the scan electrode lines 21, positive and negative voltages +Von and −Von are alternately supplied to the scan electrode lines 21. There is a predetermined voltage difference between each of the positive and negative voltages +Von and −Von and the common voltage. In other words, switch-on and switch-off voltages of 3-step voltage level synchronized with the left and right eye images displayed on the display device 15 are supplied to the scan electrode lines 21. The switch-on voltages +Von and −Von, that are respectively generated as a positive voltage and a negative voltage with respect to the common voltage. The 3-step voltage prevents the deterioration of the liquid crystals due to DC voltages. The common voltage supplied to the common electrode of the display device 15 and the common voltage and the switch-off voltage Voff respectively supplied to the common electrode 22 and the scan electrode lines 21 of the polarization switching element 16 may be set to 7.5V. Further, the switch-on voltages +Von and −Von supplied to the scan electrode lines 21 may be set to 15V and 0V, respectively. Because each of the upper and lower glass substrates of the polarization switching element 16 has to transmit light of the left eye image and the right eye image each having a different polarization characteristic, a polarizing plate is not attached to each of the upper and lower glass substrates of the polarization switching element 16.

The polarization glasses 17 include a left eye polarization filter and a right eye polarization filter each having a different light absorption axis.

The image supply unit 11 supplies video data of 2-dimensional (2D) format to the controller 12 in a 2D mode and supplies left eye video data and right eye video data of 3-dimensional (3D) format to the controller 12 in a 3D mode. Further, the image supply unit 11 supplies timing signals, such as a vertical sync signal Vsync, a horizontal sync signal Hsync, a data enable signal DE, and a dot clock CLK, to the controller 12. The image supply unit 11 switches between the 2D mode and the 3D mode according to a user's selection input through a user interface. The user interface includes user input means, such as an on-screen display (OSD), a remote controller, a keyboard, and a mouse. The image supply unit 11 may encode a first identification code to the right eye video data of 3D format and may encode a second identification code to the left eye video data of 3D format, so that an operation of the polarization switching element 16 can be synchronized with the left eye and right eye images displayed on the display device 15.

The controller 12 receives the 2D format video data, the 3D format video data, and the timing signals synchronized with the 2D and 3D format video data from the image supply unit 11. The controller 12 supplies the video data received from the image supply unit 11 to the first driver 13 at a frame frequency of 60×n Hz, where n is an integer equal to or greater than 2. In the 3D mode, the controller 12 alternately supplies the left eye video data and the right eye video data to the second driver 14. Further, the controller 12 multiplies a frame frequency of an input image by "n" to increase a frequency of the timing control signals for controlling operation timing of the first and second drivers 13 and 14. The controller 12 controls a driving timing of the first driver 13, so that a scanning operation of the first driver 13 is synchronized with a scanning operation of the second driver 14.

The first driver 13 generates the switching voltages Von, −Von, and Voff of 3-step voltage level and sequentially supplies the switching voltages Von, −Von, and Voff to the scan electrode lines 21 of the polarization switching element 16 under the control of the controller 12. The first driver 13 shifts the switching voltages Von, −Von, and Voff supplied to the scan electrode lines 21 along a boundary portion of the display device 15 between the left eye image and the right eye image. The first driver 13 may be implemented as a multiplexer array selecting the switching voltage Voff synchronized with the left eye image displayed on the display device 15 and the switching voltages +Von and −Von synchronized with the right eye image displayed on the display device 15 under the control of the controller 12. Further, the first driver 13 may include a shift register, a level shifter for shifting an output of the shift register to the switching voltages Von, −Von, and Voff, and the like. In addition, the first driver 13 may be implemented as any analog or digital circuit capable of sequentially supplying the switching voltages Von, −Von, and Voff to the scan electrode lines 21.

The second driver 14 includes a data drive circuit connected to the data lines and a gate drive circuit connected to the gate lines. The data drive circuit converts digital video data received from the controller 12 into positive and negative analog video data voltages under the control of the controller 12 to supply the positive and negative analog video data voltages to the data lines. The gate drive circuit sequentially supplies a gate pulse (or a scan pulse) to the gate lines under the control of the controller 12.

Figure 3:
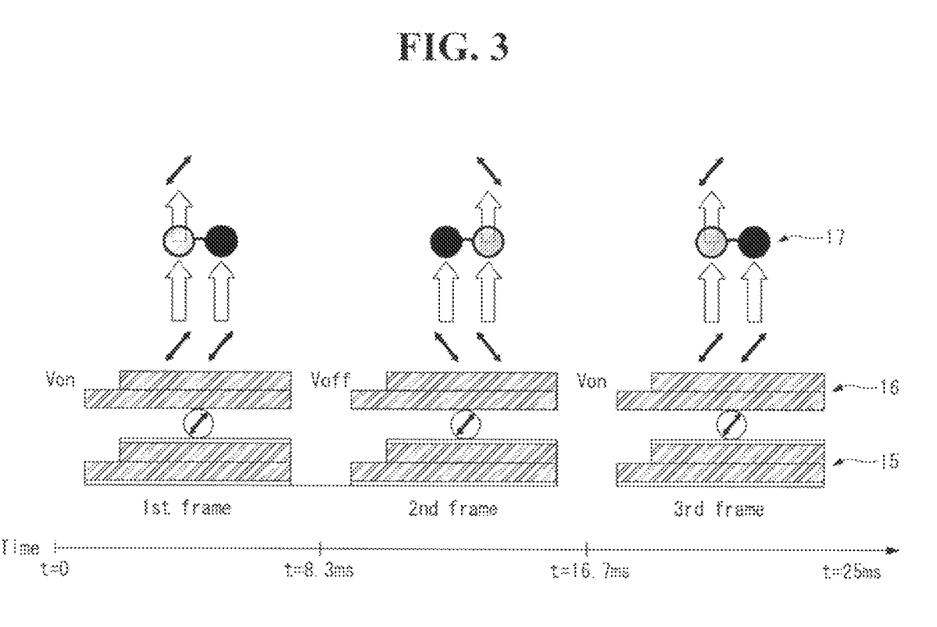
FIG. 3 illustrates polarization characteristic of light switched by a polarization switching element depending on left and right eye images.

FIG. 3 illustrates an example of a 3D mode operation of the stereoscopic image display device according to the embodiment of the invention.

As shown in FIG. 3, the display device 15 alternately displays the left eye image and the right eye image in the 3D mode and transmits light of the left eye image and light of the right eye image through the upper polarizing plate POL1 to obtain left polarized light (i.e., left polarization). When the switching voltage Voff is supplied to the scan electrode lines 21, the polarization switching element 16 retards the left polarized light from the display device 15 by 90° to obtain right polarized light. Then, the polarization glasses 17 transmit the right polarized light. When the switching voltage +Von/−Von is supplied to the scan electrode lines 21, the polarization switching element 16 transmits the left polarized light from the display device 15 without retardation. Accordingly, the display device 15 and the polarization switching element 16 are driven at a frame frequency of 120 Hz, the left eye image is displayed on the display device 15 during odd-numbered frame periods, and the right eye image is displayed on the display device 15 during even-numbered frame periods. As a result, an observer may look the left eye image through his or her left eye during the odd-numbered frame periods (for example, 0-8.3 ms and 16.7-25 ms in FIG. 3) and may look the right eye image through his/her right eye during the even-numbered frame periods (for example, 8.3-16.7 ms and 25-32.3 ms in FIG. 3). The left polarization is one of vertically linear polarization (or horizontally linear polarization) and left circular polarization (or right circular polarization). Further, the left polarization has an optical axis crossing an optical axis of right polarization and is one of horizontally linear polarization (or vertically linear polarization) and right circular polarization (or left circular polarization).

The display device 15 displays the image of the 2D format in the 2D mode. The observer may take off the polarization glasses 17 in the 2D mode to look the 2D image displayed on the display device 15.

Figure 4A:
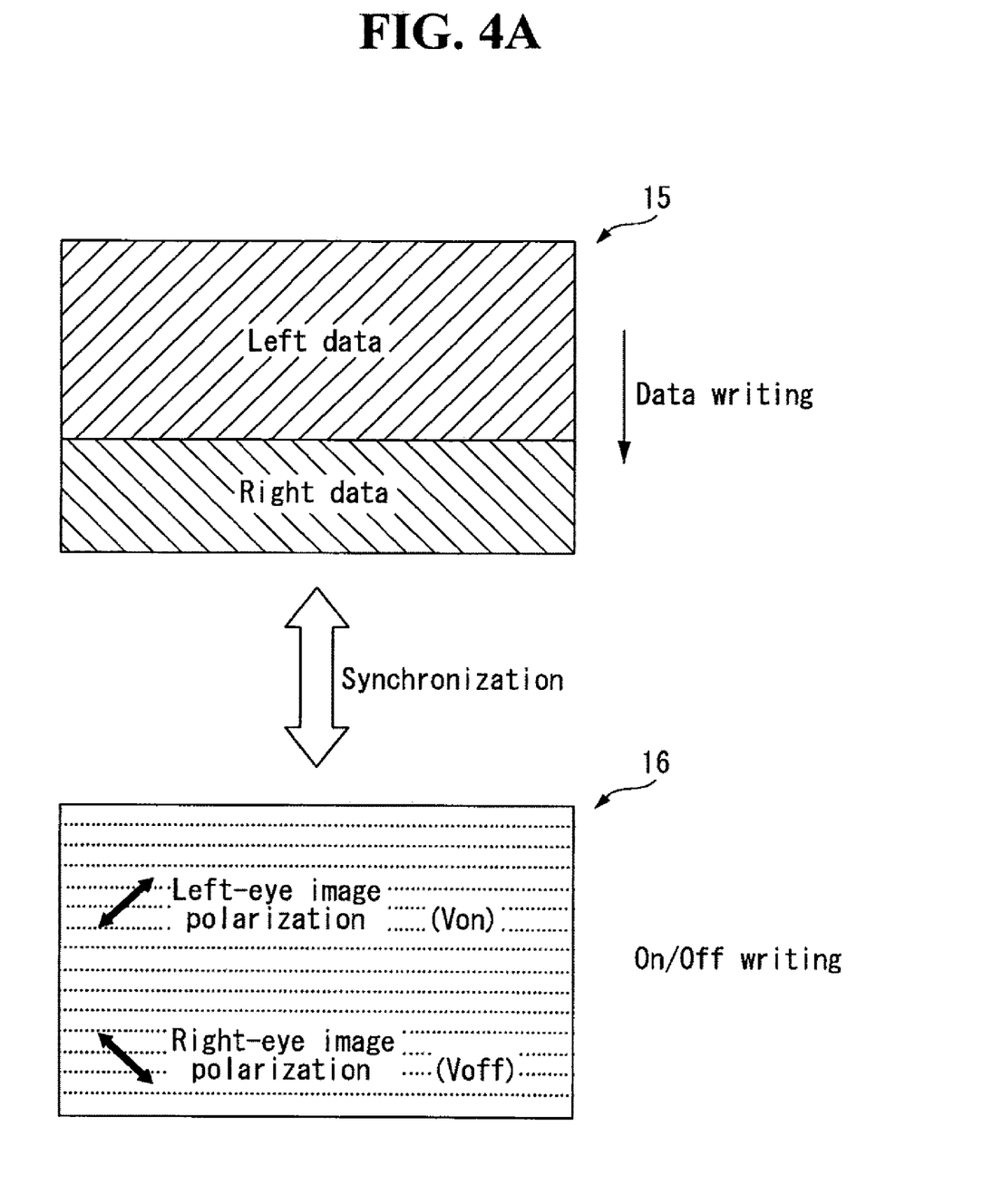
FIGS. 4A and 4B illustrate voltage changes in scan electrode lines of a polarization switching element switched along a boundary between left and right eye images displayed on a display device.
Figure 4B:
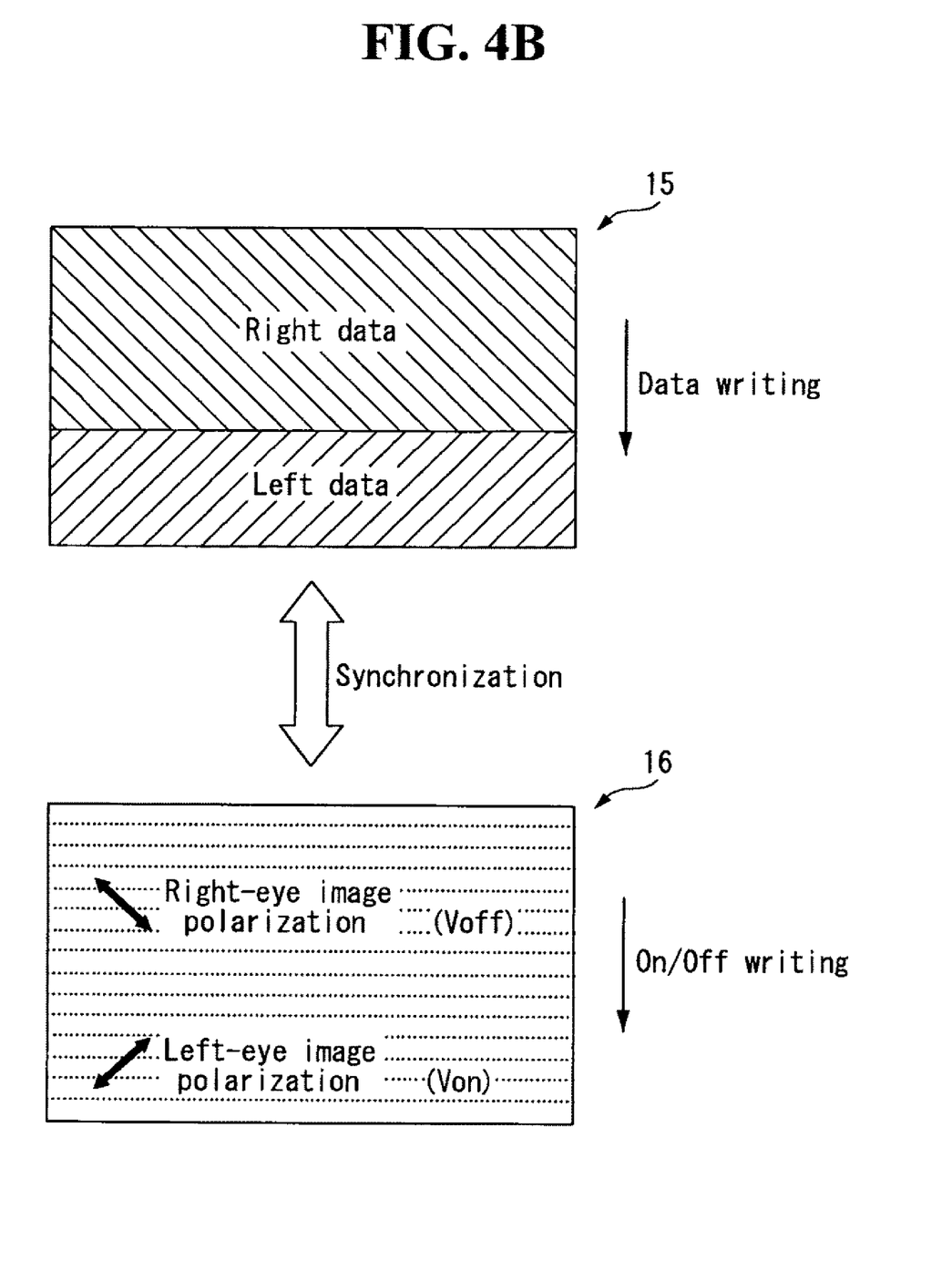

FIGS. 4A and 4B illustrate scanning synchronization between the display device 15 and the polarization switching element 16.

As shown in FIGS. 4A and 4B, the display device 15 sequentially writes video data of the left eye image corresponding to each line of the display device 15 during a frame period in the 3D mode. Subsequently, the display device 15 sequentially writes video data of the right eye image corresponding to each line of the display device 15 during a next frame period in the 3D mode. Namely, before the writing of the left eye video data (or the right eye video data) during a frame period, the liquid crystal cells has been charged to the right eye video data (or the left eye video data) of a previous frame period.

Figure 5:
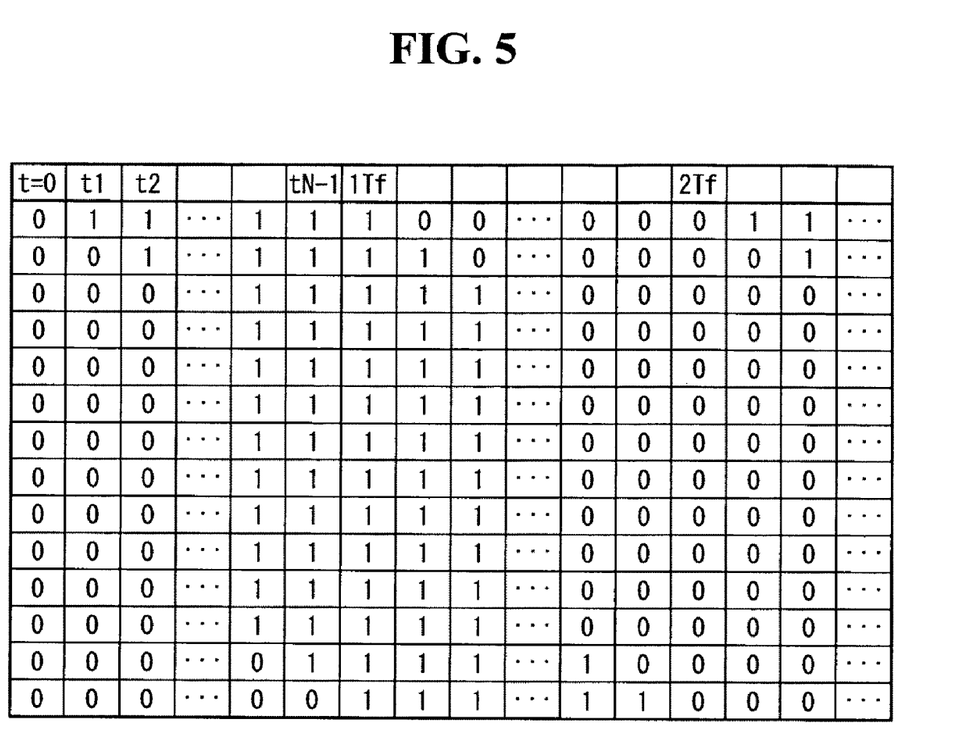
FIG. 5 illustrates changes in a logic value of a control signal controlling a voltage of scan electrode lines of a polarization switching element.

The first driver 13 controls the voltage supplied to the scan electrode lines 21 of the polarization switching element 16 under the control of the controller 12 as in a logic table shown in FIG. 5.

In FIG. 5, '1' indicates the switching voltage +Von/−Von (supplied to the scan electrode lines 21) synchronized with scan time of the left eye video data written in the display device 15, and '0' indicates the switching voltage Voff (supplied to the scan electrode lines 21) synchronized with scan time of the right eye video data written in the display device 15. Further, in FIG. 5, lines have one to one correspondence to the scan electrode lines 21 of the polarization switching element 16, and 't=0, 2Tf' on an uppermost line indicate time.

In FIG. 5, at time '1Tf', the switching voltage +Von/−Von is supplied to all of the scan electrode lines 21 from a first scan electrode line 21 of to a last scan electrode line 21. Then, if the right eye image is scanned on the display device 15 from the first line, the switching voltage Voff starts to be sequentially supplied to each of the scan electrode lines 21 along a scanning direction of the right eye image. Accordingly, the voltage of the scan electrode lines 21 varies from the switching voltage +Von/−Von to the switching voltage Voff along the line in which the image displayed on the display device 15 changes from the left eye image to the right eye image. Further, the voltage of the scan electrode lines 21 changes from the switching voltage Voff to the switching voltage +Von/−Von along the line in which the image displayed on the display device 15 changes from the right eye image to the left eye image.

The stereoscopic image display device according to the embodiment of the invention can synchronize the left and right eye images displayed on the display device 15 with the switching voltages Voff and +Von/−Von of the polarization switching element 16 by scanning a driving voltage of the polarization switching element 16 along the scanning direction of the left and right eye images displayed on the display device 15. The controller 12 checks identification codes of the left and right eye images to thereby enable the driving voltage of the polarization switching element 16 to switch between the switching voltages Voff and +Von/−Von according to the left or right eye image displayed on the display device 15.

Figure 6:
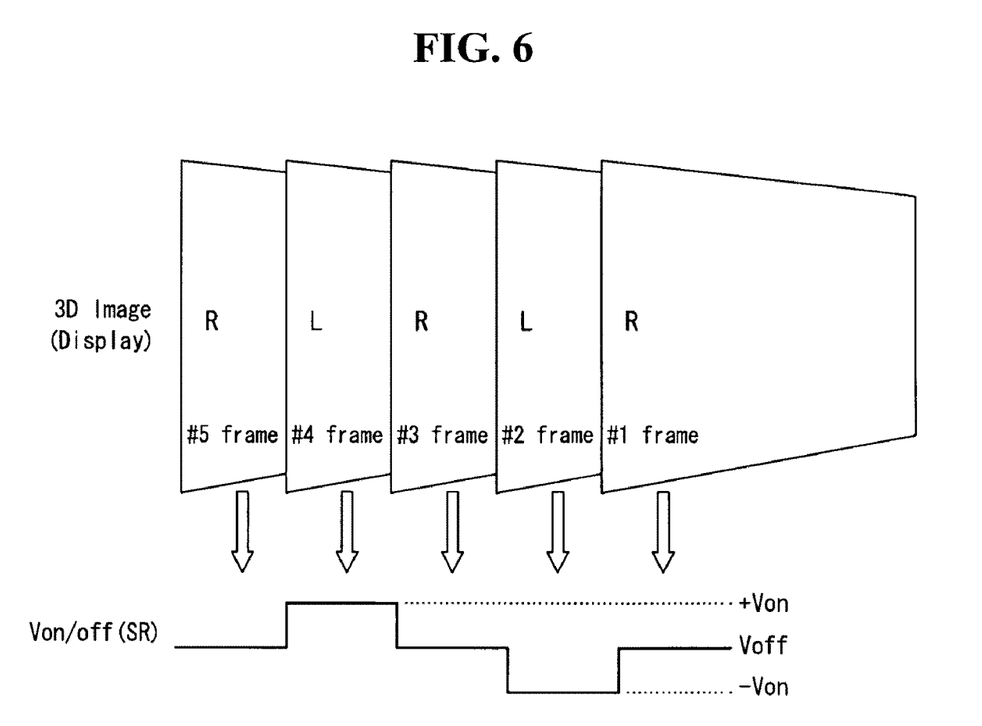
FIG. 6 illustrates a left or right eye image displayed on a display device and a voltage supplied to scan electrode lines of a polarization switching element synchronized with the left or right eye image.

FIG. 6 illustrates a left or right eye image displayed on the display device 15 and a voltage supplied to the scan electrode lines 21 synchronized with the left or right eye image. In FIG. 6, Von/Voff(SR) indicates a polarization switching voltage supplied to the scan electrode lines 21 of the polarization switching element 16.

As shown in FIG. 6, when the left eye image is displayed on the display device 15, the polarization switching voltage +Von/−Von synchronized with the left eye image is supplied to the scan electrode lines 21. On the other hand, when the right eye image is displayed on the display device 15, the polarization switching voltage Voff synchronized with the right eye image is supplied to the scan electrode lines 21. As a result, the observer may feel ortho-stereoscopy because of binocular parallax. When the voltage supplied to the scan electrode lines 21 is switched every 1 frame period in response to the vertical sync signal Vsync irrespective of the image on the display device 15, the observer may feel pseudo-stereoscopy if the left or right eye image on the display device 15 changes. In an initial drive in which the stereoscopic image display device is powered on, the driving circuits 11 to 14 go through an initialization process. Because the driving circuits 11 to 14 may operate unstably in the initialization process, the order of the left or right eye image may change. For example, the order of the left or right eye image may change because of operation errors in multi-tasking operations of a computer. In this case, the left or right eye image displayed on the display device 15 is not synchronized with the voltage supplied to the scan electrode lines 21.

Figure 7A:
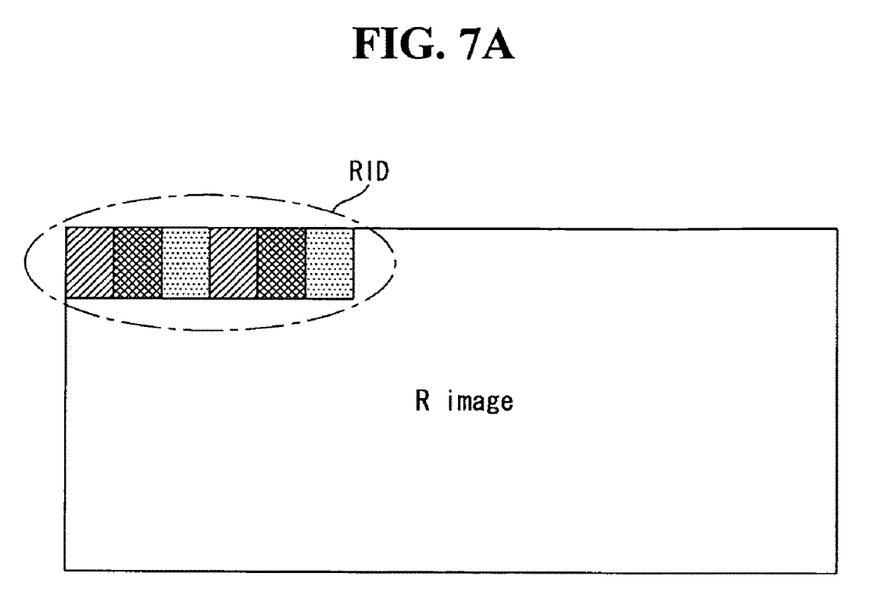
FIGS. 7A and 7B illustrate a position of a pixel of each of left and right eye images to which an identification code is encoded.
Figure 7B:
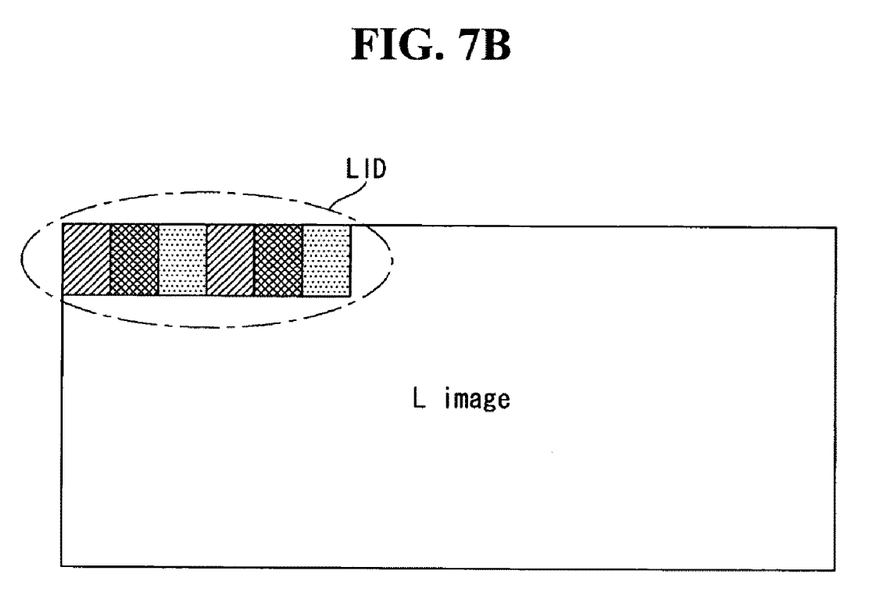

To prevent such a problem, in the stereoscopic image display device according to the embodiment of the invention, as shown in FIGS. 7A and 7B, a first identification code RID is encoded to specific pixel data of right eye video data, and a second identification code LID is encoded to specific pixel data of left eye video data.

Figure 8:
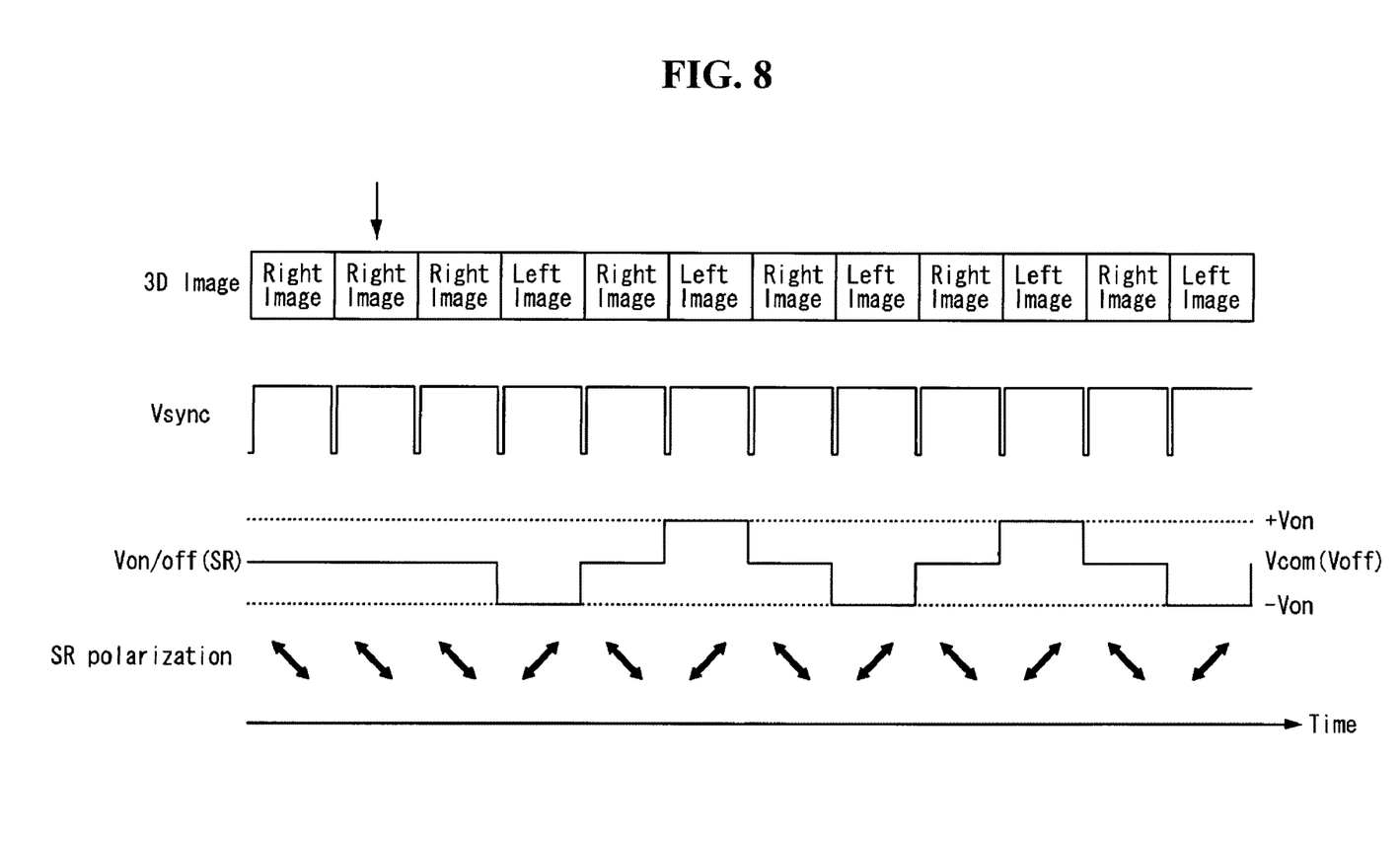
FIG. 8 is a waveform diagram illustrating a voltage of scan electrode lines of a polarization switching element when an order of left and right eye images transferred to a display device changes.

As shown in FIGS. 7A and 7B, 16-bit data of (01010101, 10101010) as the first identification code RID may be encoded to a pixel, for example, pixels (1, 1) and (1, 2) positioned at a corner of the display device 15 in which there is little change in the screen of the right eye image because a background of the right eye image is mainly displayed in the corner. In addition, the observer scarcely gives attention to the corner. Further, 16-bit data of (10101010, 01010101) as the second identification code LID may be encoded to a pixel, for example, pixels (1, 1) and (1, 2) positioned at a corner of the display device 15 in which there is little change in the screen of the left eye image because a background of the left eye image is mainly displayed in the corner. In addition, the observer scarcely gives attention to the corner. The controller 12 respectively extracts the first and second identification codes RID and LID from the right eye video data and the left eye video data received from the image supply unit 11 in the 3D mode and thus may control the voltage supplied to the scan electrode lines 21 of the polarization switching element 16 to a voltage suitable for the left and right eye images displayed on the display device 15. For example, if not the left eye video data but the right eye video data is transferred to the display device 15 during a frame period indicated by the arrow in FIG. 8, the controller 12 extracts the first identification code RID from the right eye video data to be transferred to the display device 15 and changes a logic value as indicated in the logic table of FIG. 5. Hence, the voltage supplied to the scan electrode lines 21 varies from the switching voltage +Von/−Von to the switching voltage Voff.

As described above, in the stereoscopic image display device and the method for driving the same according to the embodiment of the invention, the scanning operations of the left and right eye images of the display device 15 can be synchronized with the scanning operation of the polarization switching element 16 by varying the voltage supplied to the scan electrode lines 21 of the polarization switching element 16 along a line of the display device 15 in which the left and right eye images change. Further, the identification codes are inserted into the left and right eye images, and the voltage supplied to the scan electrode lines 21 of the polarization switching element 16 can be controlled according to the identification codes.

Although embodiments have been described with reference to a number of illustrative embodiments thereof, it should be understood that numerous other modifications and embodiments can be devised by those skilled in the art that will fall within the scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display device comprising:
a display device that time-division displays a right eye image and a left eye image;
polarization glasses in which a polarization characteristic of a right lens and a polarization characteristic of a left lens are different from each other;
a polarization switching element between the display device and the polarization glasses, the polarization switching element including a plurality of scan electrode lines, the polarization switching element switching a polarization characteristic of light travelling to the polarization glasses according to a voltage supplied to the scan electrode lines;
a driver that supplies a first voltage synchronized with the right eye image displayed on the display device to the scan electrode lines and supplies a second voltage synchronized with the left eye image displayed on the display device to the scan electrode lines; and
a controller that supplies right eye video data of the right eye image and left eye video data of the left eye image to the display device and controls the driver so that a voltage of the scan electrode lines of the polarization switching element varies from the first voltage to the second voltage along a line of the display device in which the image displayed changes from the right eye image to the left eye image and the voltage of the scan electrode lines of the polarization switching element varies from the second voltage to the first voltage along a line of the display device in which the image displayed changes from the left eye image to the right eye image.

2. The stereoscopic image display device of claim 1, further comprising an image supply unit that inserts a first identification code into the right eye video data, inserts a second identification code into the left eye video data, and supplies the right eye video data and the left eye video data, into which the first and second identification codes are respectively inserted, to the controller.

3. The stereoscopic image display device of claim 2, wherein the first identification code is inserted into pixel data, that will be supplied to a pixel positioned at a corner of the display device, among the right eye video data,
wherein the second identification code is inserted into pixel data, that will be supplied to a pixel positioned at a corner of the display device, among the left eye video data.

4. The stereoscopic image display device of claim 3, wherein the image supply unit supplies video data of a 2-dimensional (2D) format to the controller in a 2D mode and supplies the right eye video data including the first identification code and the left eye video data including the second identification code to the controller in a 3-dimensional (3D) mode.

5. The stereoscopic image display device of claim 4, wherein the image supply unit switches between the 2D mode and the 3D mode according to a user's selection input through a user interface.

6. The stereoscopic image display device of claim 2, wherein the controller checks the first and second identification codes to allow the voltage of the scan electrode lines to switch between the first voltage and the second voltage.

7. The stereoscopic image display device of claim 1, wherein the display device includes one of a liquid crystal display (LCD), a field emission display (FED), a plasma display panel (PDP), and an electroluminescence device (EL).

8. A method of driving a stereoscopic image display device comprising:
time-division displaying a right eye image and a left eye image on a display device;
switching a polarization characteristic of light travelling to polarization glasses according to a voltage supplied to a plurality of scan electrode lines formed in a polarization switching element between the display device and the polarization glasses;
supplying a first voltage synchronized with the right eye image displayed on the display device to the scan electrode lines and supplying a second voltage synchronized with the left eye image displayed on the display device to the scan electrode lines; and
supplying right eye video data of the right eye image and left eye video data of the left eye image to the display device, varying a voltage of the scan electrode lines of the polarization switching element from the first voltage to the second voltage along a line of the display device in which the image displayed changes from the right eye image to the left eye image, and varying the voltage of the scan electrode lines of the polarization switching element from the second voltage to the first voltage along a line of the display device in which the image displayed changes from the left eye image to the right eye image.

9. The method of claim 8, further comprising:
inserting a first identification code into the right eye video data to be supplied to the display device; and
inserting a second identification code into the left eye video data to be supplied to the display device.

10. The method of claim 9, wherein the first identification code is inserted into pixel data, that will be supplied to a pixel positioned at a corner of the display device, among the right eye video data,
wherein the second identification code is inserted into pixel data, that will be supplied to a pixel positioned at a corner of the display device, among the left eye video data.

11. The method of claim 10, further comprising:
displaying video data of a 2-dimensional (2D) format on the display device in a 2D mode; and
displaying the right eye video data including the first identification code and the left eye video data including the second identification code on the display device in a 3-dimensional (3D) mode.

12. The method of claim 11, further comprising switching between the 2D mode and the 3D mode according to a user's selection input through a user interface.

13. The method of claim 9, wherein the varying of the voltage of the scan electrode lines from the first voltage to the second voltage comprises checking the first and second identification codes to allow the voltage of the scan electrode lines to switch between the first voltage and the second voltage.

* * * * *